US012608907B2

(12) United States Patent
Liu et al.

(10) Patent No.: US 12,608,907 B2
(45) Date of Patent: Apr. 21, 2026

(54) DETERMINING A VISIBILITY MEASURE BASED ON AN IMAGE OF AN ENVIRONMENT

(71) Applicant: University of Washington, Seattle, WA (US)

(72) Inventors: Chenxi Liu, Seattle, WA (US); Ruimin Ke, Seattle, WA (US); Yinhai Wang, Seattle, WA (US)

(73) Assignee: University of Washington, Seattle, WA (US)

( * ) Notice: Subject to any disclaimer, the term of this patent is extended or adjusted under 35 U.S.C. 154(b) by 363 days.

(21) Appl. No.: 18/359,607

(22) Filed: Jul. 26, 2023

(65) Prior Publication Data

US 2024/0037899 A1 Feb. 1, 2024

Related U.S. Application Data

(60) Provisional application No. 63/392,273, filed on Jul. 26, 2022.

(51) Int. Cl.
*G06V 10/56* (2022.01)
*G06T 7/90* (2017.01)
*G06V 10/60* (2022.01)

(52) U.S. Cl.
CPC ............... *G06V 10/56* (2022.01); *G06T 7/90* (2017.01); *G06V 10/60* (2022.01); *G06T 2207/10024* (2013.01)

(58) Field of Classification Search
CPC ........ G06V 10/56; G06V 10/60; G06V 20/56; G06T 7/90; G06T 2207/10024
See application file for complete search history.

(56) References Cited

U.S. PATENT DOCUMENTS 9,177,363 B1 * 11/2015 Huang ...................... G06T 5/73

OTHER PUBLICATIONS

"How Do Weather Events Impact Roads?", Available online at: https://ops.fhwa.dot.gov/weather/q1_roadimpact.htm, Accessed from internet on Oct. 24, 2023, pp. 1-4.
Abdel-Aty et al., "A Study on Crashes Related to Visibility Obstruction Due to Fog and Smoke", Accident Analysis and Prevention, vol. 43, No. 5, Sep. 2011, pp. 1730-1737.
An et al., "Visibility Detection Method and System Design Based on Traffic Video", Chinese Journal of Scientific Instrument, vol. 31, No. 5, May 2010, pp. 1148-1153.

(Continued)

*Primary Examiner* — Christopher Wait
(74) *Attorney, Agent, or Firm* — Kilpatrick Townsend & Stockton LLP

(57) ABSTRACT

An edge device can include a processing device, an image sensor, and a memory having instructions that are executable by the processing device for causing the processing device to perform operations. The processing device can receive, from the image sensor, an image of an environment. The processing device can determine a visibility measure corresponding to the environment by determining a dark channel of the image, determining, based on the dark channel of the image, a transmission map of the image, and determining, based on the transmission map, a visual contrast of the image. The processing device can generate information corresponding to the visibility measure.

13 Claims, 7 Drawing Sheets

(56) References Cited

OTHER PUBLICATIONS

Babari et al., "A Model-Driven Approach to Estimate Atmospheric Visibility with Ordinary Cameras", Atmospheric Environment, vol. 45, Sep. 2011, pp. 5316-5324.

Babari et al., "Visibility Monitoring Using Conventional Roadside Cameras—Emerging Applications", Transportation Research Part C, vol. 22, Jun. 2012, pp. 17-28.

Baumer et al., "Determination of the Visibility Using a Digital Panorama Camera", Atmospheric Environment, vol. 42, No. 11, Apr. 2008, pp. 2593-2602.

Bronte et al., "Fog Detection System Based on Computer Vision Techniques", Proceedings of the 12th International IEEE Conference on Intelligent Transportation Systems, Oct. 3-7, 2009, pp. 30-35.

Camacho et al., "Analysis of Impact of Adverse Weather on Freeway Free-Flow Speed in Spain", Transportation Research Record Journal of the Transportation Research Board, No. 2169, Dec. 2010, pp. 150-159.

Chen et al., "Design of Daytime Visibility Algorithm for Digital Camera Visibility Instrument", Journal of Electronic Measurement and Instrument, vol. 27, No. 4, Apr. 2014, pp. 353-358.

Chen et al., "Video Contrast Visibility Detection Algorithm and Its Implementation Based on Camera Self-Calibration", Journal of Electronics & Information Technology, vol. 32, No. 12, Dec. 2010, pp. 2907-2912.

Chen et al., "Video Visibility Detection Algorithm Based on Wavelet Transformation", Chinese Journal of Scientific Instrument, vol. 31, No. 1, Jan. 2010, pp. 92-98.

Goldstein , "Sensation and Perception", The Perceptual Process, 1980, 490 pages.

Hallowell et al., "An Automated Visibility Detection Algorithm Utilizing Camera Imagery", Massachusetts Institute of Technology Lincoln Laboratory, Jan. 2007, pp. 1-15.

Hallowell et al., "Automated Extraction of Weather Variables from Camera Imagery", Proceedings of the 2005 Mid-Continent Transportation Research Symposium, Aug. 2005, pp. 1-12.

Hassan et al., "Effect of Warning Messages and Variable Speeds in Different Visibility Conditions", Available online at: https://trid.trb.org/view/1091367, 2011, pp. 1-2.

Hautiere et al., "Automatic Fog Detection and Estimation of Visibility Distance Through Use of an Onboard Camera", Machine Vision and Applications, vol. 17, No. 1, Jan. 27, 2006, pp. 8-20.

He et al., "Single Image Haze Removal Using Dark Channel Prior", IEEE Transactions on Pattern Analysis and Machine Intelligence, vol. 33, No. 12, Dec. 2011, pp. 2341-2353.

Li et al., "Visibility Detection Algorithm Based on Date Camera Technology for Road Monitoring", Modern Electronics Technique, vol. 35, No. 20, Oct. 2012, pp. 95-97.

Li et al., "Visibility Detection Based on Traffic Video Contrast Analysis without Artificial Markers", Journal of Computer-Aided Design & Computer Graphics, vol. 21, No. 11, Nov. 2009, pp. 1575-1582.

Lu et al., "Measuring Meteorological Visibility Based on Digital Photography—Dual Differential Luminance Method and Experimental Study", Chinese Journal of Atmospheric Sciences, vol. 28, No. 4, Jul. 2004, pp. 559-570.

Preetham et al., "A Practical Analytic Model for Daylight", Available online at: https://dl.acm.org/doi/pdf/10.1145/311535.311545, Jul. 1, 1999, pp. 91-100.

Rakha et al., "Inclement Weather Impacts on Freeway Traffic Stream Behavior", Transportation Research Record: Journal of the Transportation Research Board, vol. 2071, No. 1, Jan. 1, 2008, pp. 8-18.

Rose et al., "Analysis of High Temperature Forecast Accuracy of Consumer Weather Forecasts from 2005-2016", Available online at: https://www.forecastwatch.com/wp-content/uploads/High_Temperature_Accuracy_Study_12_Years.pdf, Sep. 2017, pp. 1-14.

Steffens , "Measurement of Visibility by Photographic Photometry", Industrial and Engineering Chemistry, vol. 41, No. 11, Nov. 1949, pp. 2396-2399.

Sun et al., "Quantifying Crash Risk under Inclement Weather with Radar Rainfall Data and Matched-Pair Method", Journal of Transportation Safety and Security, vol. 3, No. 1, Mar. 14, 2011, pp. 1-14.

Taek et al., "Atmospheric Visibility Measurements Using Video Cameras: Relative Visibility", Available online at: https://conservancy.umn.edu/bitstream/handle/11299/1027/CTS-04-03.pdf, Jul. 1, 2004, 53 pages.

Tang et al., "Investigating Haze-relevant Features in A Learning Framework for Image Dehazing", Available online at: https://dl.acm.org/doi/10.1109/CVPR.2014.383, Jun. 23, 2014, 8 pages.

Theofilatos et al., "A Review of the Effect of Traffic and Weather Characteristics on Road Safety", Accident Analysis and Prevention, vol. 72, Nov. 2014, pp. 244-256.

Wang et al., "Predicting Crashes on Expressway Ramps with Real-Time Traffic and Weather Data", Transportation Research Record: Journal of the Transportation Research Board, vol. 2514, No. 1, Jan. 1, 2015, pp. 32-38.

Wang , "Visibility Automatic Observation Instrument Based on the Visual Technology", 2015 Sixth International Conference on Intelligent Systems Design and Engineering Applications, Aug. 18, 2015, pp. 940-943.

Zhang et al., "PTZ Visibility Detection Algorithm Based on Luminance Characteristic and its Implementation", Chinese Journal of Scientific Instrument, vol. 32, No. 2, Feb. 2011, pp. 381-387.

Zhao et al., "Multi-Mode Detection Techniques of Video Visibility Based on Improved Dual Differential Luminance Algorithm", International Journal of Signal Processing, Image Processing and Pattern Recognition, vol. 9, No. 1, Jan. 31, 2016, pp. 147-158.

Zhou et al., "Visibility Detection System Based on Road Monitoring Camera", Electronic Measurement Technology, vol. 32, No. 6, Jun. 2009, pp. 72-76.

* cited by examiner

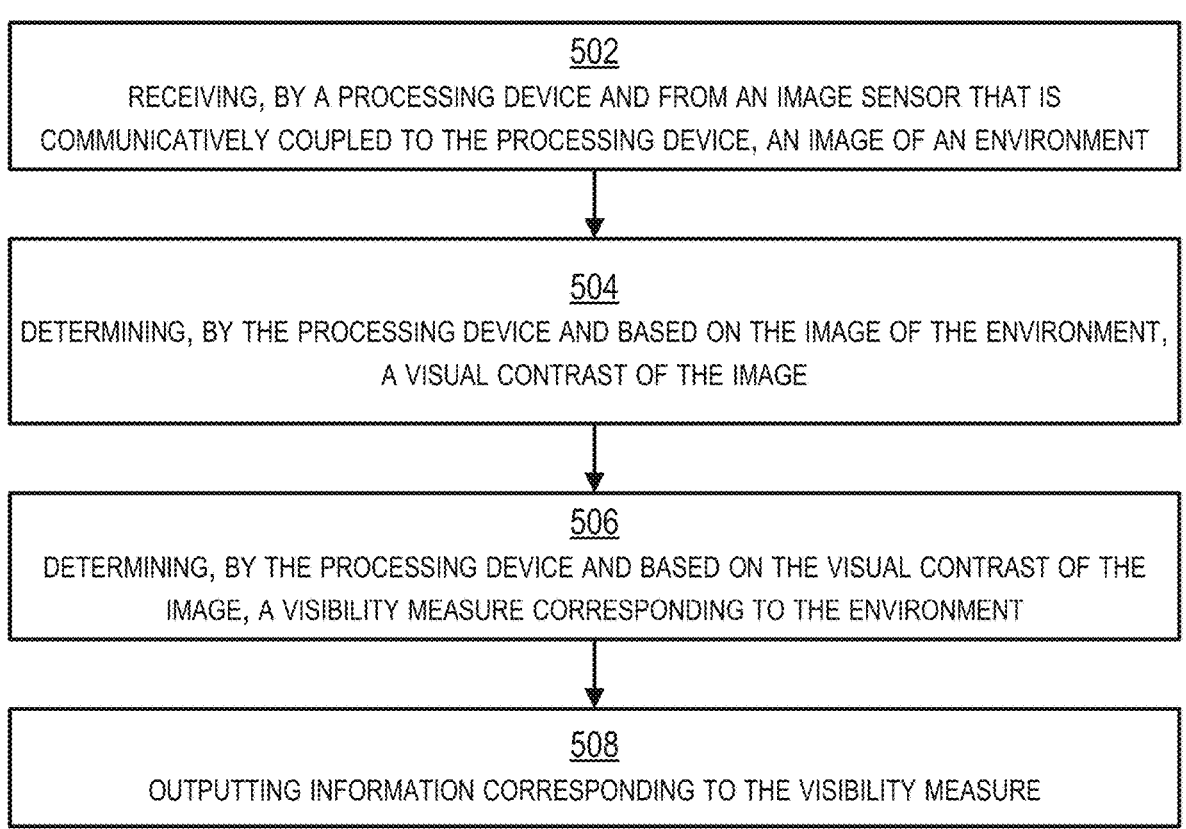

502
RECEIVING, BY A PROCESSING DEVICE AND FROM AN IMAGE SENSOR THAT IS COMMUNICATIVELY COUPLED TO THE PROCESSING DEVICE, AN IMAGE OF AN ENVIRONMENT

504
DETERMINING, BY THE PROCESSING DEVICE AND BASED ON THE IMAGE OF THE ENVIRONMENT, A VISUAL CONTRAST OF THE IMAGE

506
DETERMINING, BY THE PROCESSING DEVICE AND BASED ON THE VISUAL CONTRAST OF THE IMAGE, A VISIBILITY MEASURE CORRESPONDING TO THE ENVIRONMENT

508
OUTPUTTING INFORMATION CORRESPONDING TO THE VISIBILITY MEASURE

FIG. 5

600

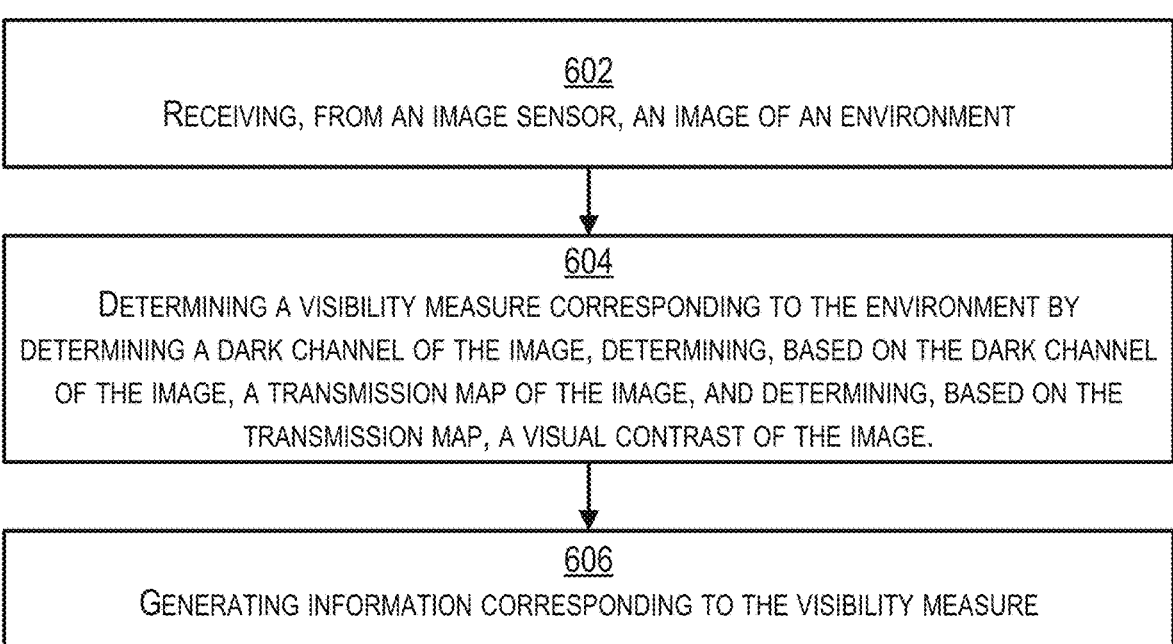

602
RECEIVING, FROM AN IMAGE SENSOR, AN IMAGE OF AN ENVIRONMENT

604
DETERMINING A VISIBILITY MEASURE CORRESPONDING TO THE ENVIRONMENT BY DETERMINING A DARK CHANNEL OF THE IMAGE, DETERMINING, BASED ON THE DARK CHANNEL OF THE IMAGE, A TRANSMISSION MAP OF THE IMAGE, AND DETERMINING, BASED ON THE TRANSMISSION MAP, A VISUAL CONTRAST OF THE IMAGE.

606
GENERATING INFORMATION CORRESPONDING TO THE VISIBILITY MEASURE

FIG. 6

DETERMINING A VISIBILITY MEASURE BASED ON AN IMAGE OF AN ENVIRONMENT

CROSS-REFERENCES TO RELATED APPLICATIONS

This application claims the benefit of U.S. Provisional Application No. 63/392,273 filed Jul. 26, 2022, the entire contents of which are hereby incorporated for all purposes in their entirety.

BACKGROUND

Extreme weather conditions such as snow, ice, and fog, especially if not accurately forecast in advance, can be hazardous for drivers. Low visibility conditions that may be associated with fog, dust, or smoke, can be extremely hazardous and can result in considerable adverse impacts in traffic safety and efficiency. Ground-based sensors such as laser-based visibility meters for visibility detection can be installed along main roads to measure visibility conditions. However, the visibility meters can be prohibitively expensive and may be impractical for widespread deployment.

BRIEF SUMMARY

An edge device can include a processing device, an image sensor, and a memory having instructions that are executable by the processing device for causing the processing device to perform operations. The processing device can receive, from the image sensor, an image of an environment. The processing device can determine a visibility measure corresponding to the environment by determining a dark channel of the image, determining, based on the dark channel of the image, a transmission map of the image, and determining, based on the transmission map, a visual contrast of the image. The processing device can generate information corresponding to the visibility measure.

TECHNICAL FIELD

The present disclosure relates generally to visibility detection, and more specifically to an edge device that can generate a visibility measure based on an image of an environment.

BRIEF DESCRIPTION OF THE DRAWINGS

The drawings illustrate several embodiments of the present disclosure, wherein identical reference numerals refer to identical or similar elements or features in different views or embodiments shown in the drawings.

FIG. 5 is a flow chart of a process for determining, by a processing device, a visibility measure of an environment based on an image of the environment, according to at least one example.

FIG. 6 is a flow chart of a process for determining, by an edge device, a visibility measure of an environment based on an image of the environment, according to at least one example.

DETAILED DESCRIPTION

Figure 1:
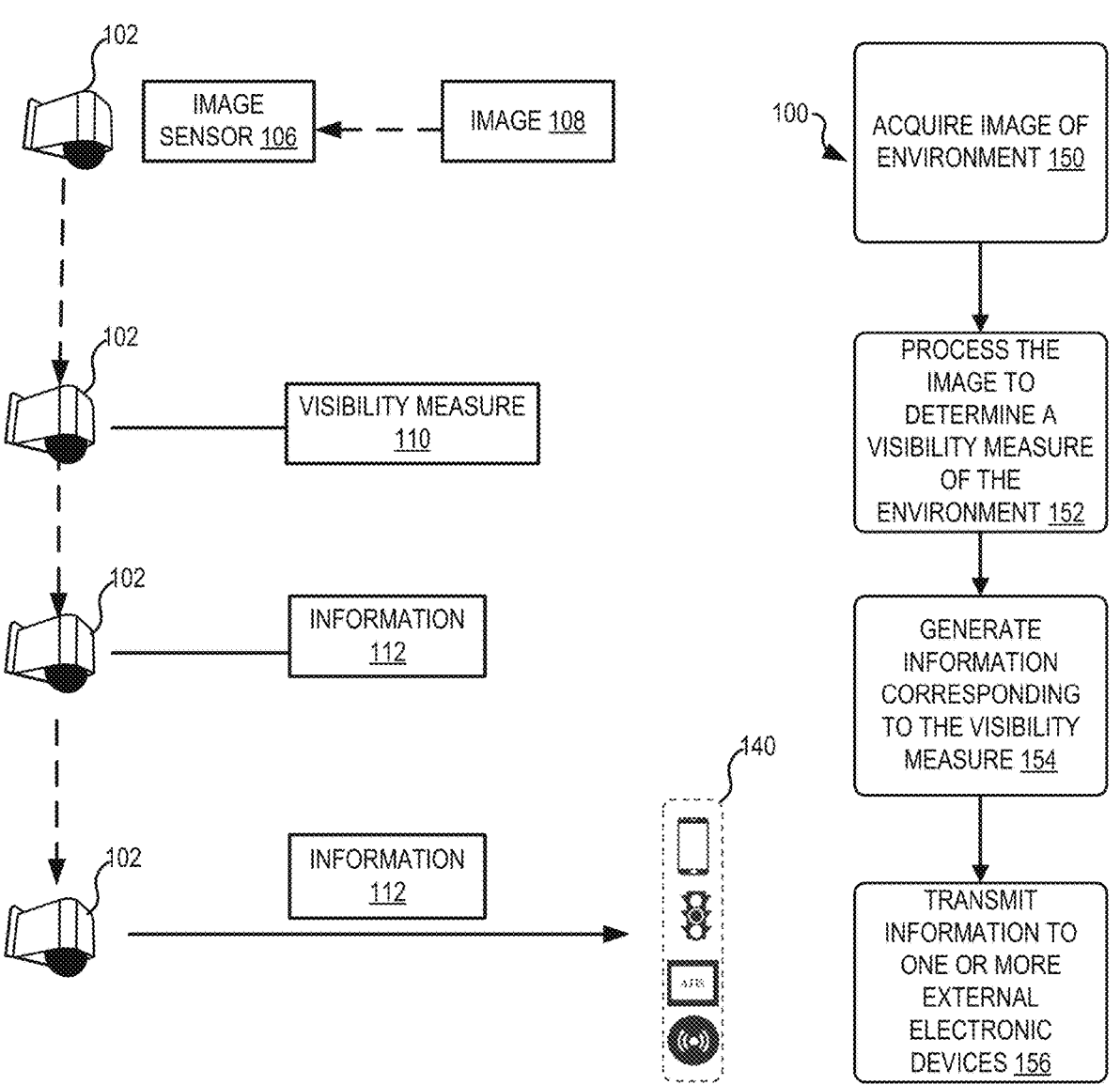
FIG. 1 is an example block diagram showing an exemplary edge device and associated flowchart for implementing techniques related to determining a visibility measure of an environment based on an image of the environment, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Inclement weather conditions such as snow, ice, and fog can be hazardous for driving safety. A warning message generated by the forecasting results can enable drivers to adjust their driving activities and behaviors to reduce the possibility of motor vehicle accidents during inclement weather conditions. Road surface condition detection can be applied to specific road segments and time periods for real-time pavement condition monitoring. An accurate real-time road surface detection algorithm can warn the drivers around to drive with caution. Low visibility conditions that may be associated with fog, dust, or smoke, is one of the most hazardous factors due to its considerable adverse impacts on traffic safety and efficiency.

Advanced sensors installed on autonomous driving vehicles can provide information related to the surrounding objects in low visibility environments to improve driving safety conditions. For example, autonomous vehicles can include thermal cameras and laser-based sensors for determining environmental conditions. In conjunction with on-board computers, the advanced sensors can provide drivers with enhanced vision about the surrounding objects, even in low visibility conditions. However, many vehicles on the road may not be equipped with advanced sensors or powerful on-board central control computer systems. For transportation agencies, the advanced sensors may be inadequate to address visibility-related safety concerns. Some visibility sensors, such as visibility meters, can be installed along roads and can provide visibility data for areas surrounding the roads. However, existing visibility meters in the market may be prohibitively expensive. Additionally, the visibility meters may be incapable of providing granular, real-time data on environmental visibility conditions. For example, visibility meters may be unable to provide real-time data and can be limited to a sample rate of one sample per each 15-to-30-minute interval. It may be desirable to implement an inexpensive camera-based solution to improve traffic safety in low visibility conditions.

The techniques described herein address various issues with conventional traffic data collection systems. For example, edge device described herein can determine a visibility measure associated with an environment based on an image, rather than relying on sensors that may be unavailable, prohibitively expensive, or may have a low sample rate or slow response time. Additionally, the edge device can perform edge computing operations and can determine the visibility measure without requiring communication with a back-end server. Additionally, the edge device can provide drivers with information indicating visibility conditions on the roadway without requiring vehicles on the roadway to be equipped with on-board sensing or connectivity capabilities.

Turning now to a particular example, in this example is provided an edge device. The edge device can include an image sensor. In some examples, the edge device can be a single device that can be installed near a roadway. The edge device can include onboard computing capabilities for processing the image collected by the onboard image sensor and generating a visibility measure based on the image. After processing, the edge device can generate information based on the visibility measure and can transmit the information to external electronic devices. Additionally, the edge device can transmit the information to a server for additional processing or use in managing traffic infrastructure.

Turning now to figures, FIG. 1 is an example block diagram 102 showing an exemplary edge device 102 and associated flowchart 100 for implementing techniques related to determining a visibility measure of an environment based on an image of the environment according to at least one example. FIG. 1 depicts an introduction to the subject matter, function, and structure, of the edge device 102 according to at least one example. The process 100 may generally be performed by the edge device 102.

The edge device 102 may be mounted proximate a roadway (e.g., intersection, onramp, freeway, etc.). The edge device 102 can include a processing device, a memory device, and an image sensor 106 that can capture the image 108 of an environment. For example, the image sensor 106 can be a conventional camera, an event camera, or any other suitable optical image sensor 106 that can capture a photographic image of the environment. In some examples, the image sensor 106 can be housed within the edge device 102. In some examples, the image sensor 106 can be communicatively coupled with the edge device 102 via an edge network that the edge device 102 is in communication with.

At block 150 of the process 100, the edge device 102 can acquire an image 108 of an environment.

At block 152 of the process 100, the edge device 102 can process the image to determine a visibility measure 110 of the environment 152. The visibility measure 110 of the environment can indicate an amount of visibility in the environment 152. In some examples, determining the visibility measure 110 can involve determining a dark channel of the image 108. Determining the dark channel of the image 108 may involve determining a local minimum corresponding to one or more red, green, and blue channels encoded in the image 108. The edge device 102 can also determine a patch size based on a resolution of the image 108 for determining the dark channel of the image 108.

In some examples, determining the visibility measure 110 can involve determining a transmission map of the image 220. For example, the edge device 102 can determine the transmission map of the image 220 based on the dark channel of the image 108. The edge device can generate a normalized haze image based on the image 108. In some examples, the edge device 102 can determine the transmission map of the image 108 based on a dark channel value of the normalized haze image.

In some examples, determining the visibility measure 210 can involve determining a visual contrast of the image 108. For example, the edge device 102 can determine the visual contrast of the image 108 based on the transmission map of the image 210.

At block 154 of the process 100, the edge device 102 can generate information 112 corresponding to the visibility measure 110. The information 112 can indicate the visibility measure 210 and may include a recommendation to take a course of action based on the value of the visibility measure 210. For example, if the visibility measure 210 indicates low visibility conditions in the environment, the information 112 may include a recommendation to exercise caution, or to deploy certain safety measures to prevent visibility-related motor vehicle accidents.

In some examples, the information 112 can be generated in a format that is ingestible by one or more external electronic devices 240. For example, the information 112 can be embedded within a particular file format, such as JSON. In some examples, the information 112 can include human-readable data that is configured to be displayed to and interpreted by non-technical operators of motor vehicles in real-time. In some examples, the information 112 may include metadata, such as timestamp data indicating the time at which the information 112 was generated. In some examples, the timestamp data can indicate the time at which the image 210 was generated.

At block 156 of the process 100, the edge device 102 can transmit the information 112 to one or more external electronic devices 240. The edge device 102 can transmit the information 112 to the one or more external electronic devices 240 via wireless signal, such as via Bluetooth signals, Wi-Fi signals, RF signals, or any other suitable wireless signals. The one or more external electronic devices 240 may include programs that can interpret the information 112 and take an action based on the visibility measure 210. In some examples, the edge device 102 can transmit the information 112 to a traffic management system. In some examples, the edge device 102 can transmit the information 112 to an on-board computer installed in a vehicle. For example, the edge device 102 can transmit the information to a computing device embedded in a connected and autonomous vehicle. In some examples, the edge device 102 can transmit the information 112 to a cell phone. In some examples, the edge device 102 can transmit the information 112 to elements of traffic infrastructure, such as electronic signposts. In some examples, the edge device 102 can transmit the information 112 to a weather tracking center. In some examples, the edge device 102 can transmit the information to other edge-based devices that are coupled to the edge device 102 via an edge network. The edge device 102 may be able to generate visibility measures at a higher sample rate than other sensors coupled to the traffic management system and can enable the traffic management system to respond to low-visibility conditions more quickly. For example, the edge device 102 can transmit an indication of low-visibility conditions to the traffic management system in real-time, thereby enabling the traffic management system to adjust elements of an infrastructure associated with the environment.

Figure 2:
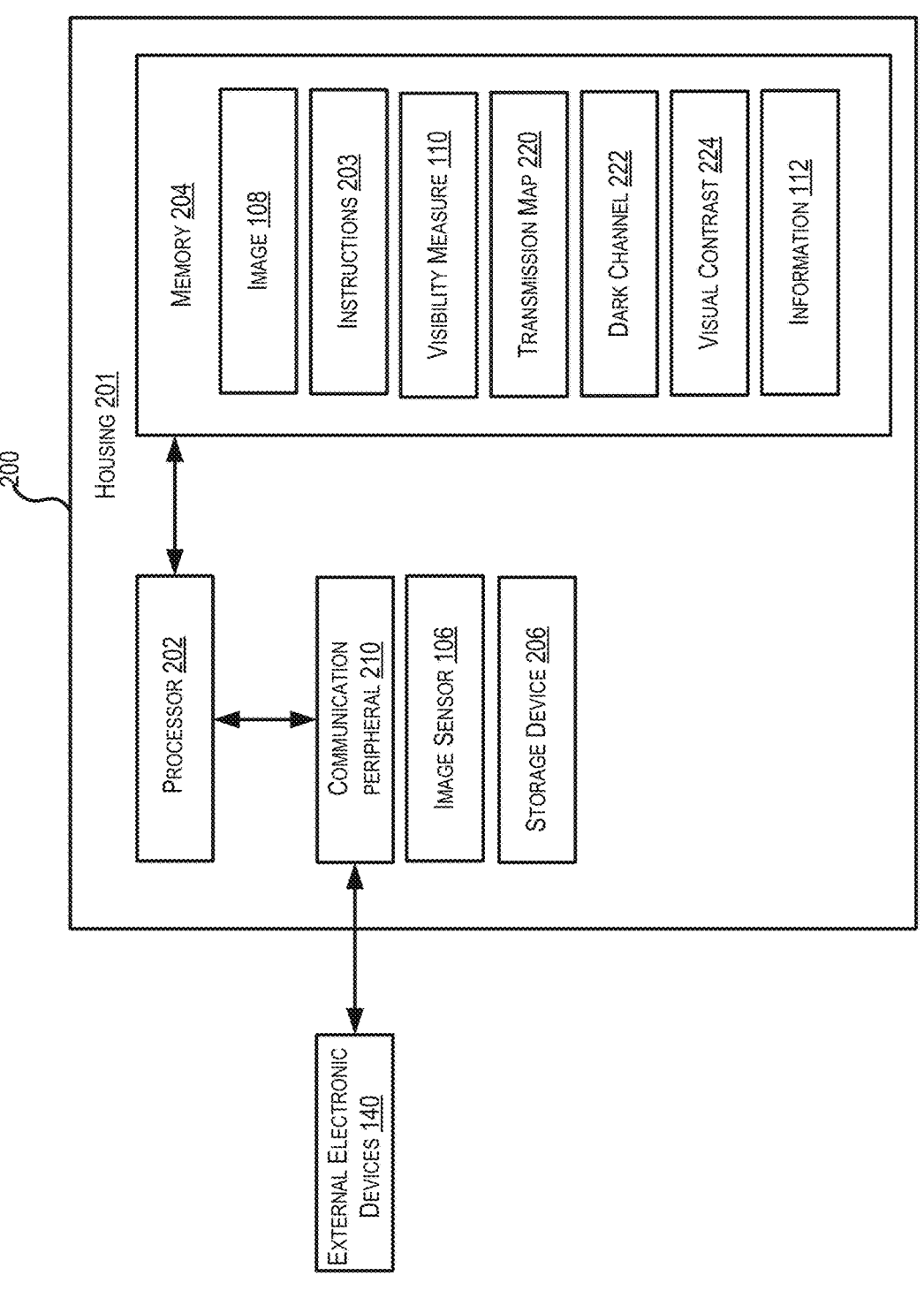
FIG. 2 is an example block diagram of an exemplary edge device for determining a visibility measure of an environment based on an image of the environment, according to at least one example.

FIG. 2 is an example block diagram of an exemplary edge device for determining a visibility measure of an environment based on an image of the environment according to at least one example. The edge device 200 includes at least a processor 202, a memory 204, a storage device 206, communication peripherals 210, a housing 201, and an interface bus 212. The interface bus 212 is configured to communicate, transmit, and transfer data, controls, and commands among the various components of the edge device 200. The memory 204 and the storage device 206 include computer-readable storage media, such as RAM, ROM, electrically erasable programmable read-only memory (EEPROM), hard drives, CD-ROMs, optical storage devices, magnetic storage devices, electronic non-volatile computer storage; for example, Flash® memory, and other tangible storage media. Any of such computer-readable storage media can be configured to store instructions 201 or program codes embodying aspects of the disclosure. The memory 204 and the storage device 206 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 200.

Further, the memory 204 can include an operating system, programs, and applications. The processor 202 is configured to execute the stored instructions and includes, for example, a logical processing unit, a microprocessor, a digital signal processor, and other processors. The memory 204 and/or the processor 202 can be virtualized and can be hosted within another computer system of, for example, another device on an edge network that the edge device 200 is coupled to. The communication peripherals 210 can be configured to facilitate communication between the edge device 200 and other systems over a communications network and include, for example, a network interface controller, modem, wireless and wired interface cards, antenna, and other communication peripherals.

The memory 204 can store an image 108. The image 108 can be captured by the image sensor 106 and received from the image sensor 106. For example, the processor 202 can retrieve the image 108 from the image sensor 106 and can store the image 108 in memory. The image 108 can an image file that can be stored in a PNG format, JPEG format, RAW format, or any other suitable image file format. The image 108 can have red, green, and blue channels. In some examples, the memory 204 can include a dark channel 222 corresponding to the image 108. In some examples, the processor 202 can generate the dark channel 222 based on the image 108. The dark channel 222 can include one or more local minima corresponding to red, green, and blue channels in the image 108.

The processor 202 can determine a visibility measure 210 based on the image 108. The visibility measure 210 can be stored in the memory 204. The visibility measure 210 can be stored as a numerical value, a set of numerical values, a string of characters, a data structure containing values, or any other suitable format. The processor 202 can determine a transmission map 220 based on the image 108. The transmission map 220 can be a haze-free version of the image 108 and can be used to determine an amount of haze in the image 108. In some examples, the processor 202 can use the transmission map 220 to determine the visibility measure 210. In some examples, the processor 202 can use the amount of haze in the image 108 to determine the visibility measure 210.

The memory 204 can include a visual contrast 224. The visual contrast 224 can be stored as one or more numerical values. The processor 202 can determine the visual contrast 224 based on the transmission map 220 of the image 108.

For example, the processor 202 can compute the visual contrast 224 by taking the difference between the intensity of the background of the image 108 and the intensity of one or more foreground objects in the image 108.

Figure 3:
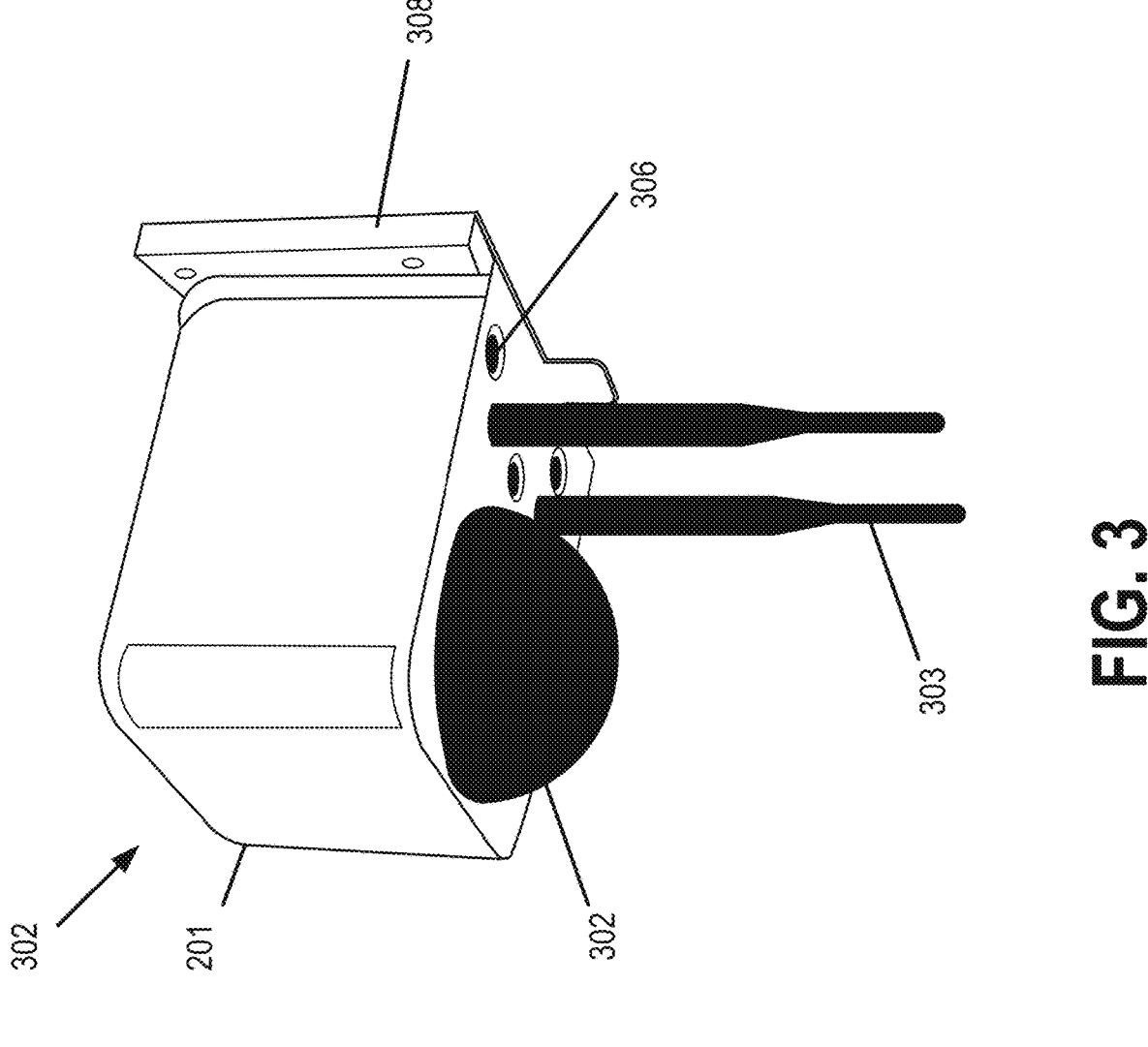
FIG. 3 is an illustration of an example edge device for determining a visibility measure of an environment based on an image of the environment, according to at least one example.

FIG. 3 is an illustrative commercial embodiment 300 of a mobile roadway sensing unit 102 according to at least one example. The edge device 102 can be housed in a housing 201. The edge device 102 can include a dome cover 302 for shielding an image sensor from the elements. The edge device 102 can also include one or more antennas 304 for communicatively coupling the edge device 102 to external electronic devices 140. In some examples, the edge device 102 can include one or more apertures 306 that can be sized to receive sensor components or other suitable components. The edge device 102 can include a mounting bracket 308 that can be used to fasten the edge device 102 to existing features of roadway architecture (e.g., traffic poles). The edge device 102 can be used to determine a visibility measure corresponding to the environment.

Figure 4:
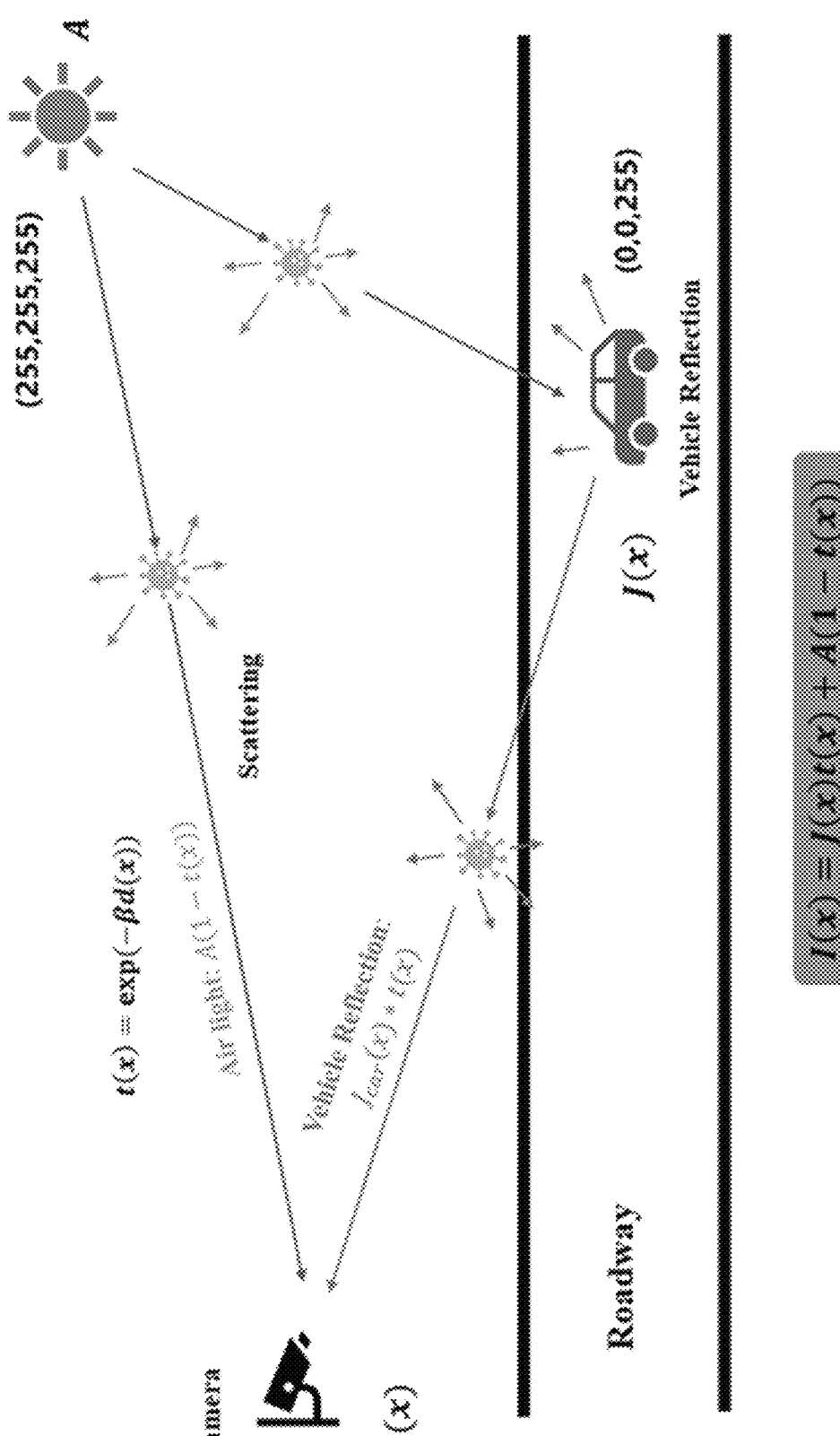
FIG. 4 illustrates an exemplary environment and edge device usable for implementing techniques related to determining a visibility measure of an environment based on an image of the environment, according to at least one example.

FIG. 4 illustrates an exemplary environment and edge device usable for implementing techniques related to determining a visibility measure of an environment based on an image of the environment according to at least one example. In low-visibility conditions, such as fog, smoke, or storm weather conditions, an increased density of water droplets, dust, and other particles in the air can result in significant light scattering. An edge device 102 that is positioned in the environment can capture images of the environment. The edge device 102 can quantify and remove the haze from the image captured by a sensor installed on the edge device 102, such as a surveillance camera.

The hazed image captured by an image sensor onboard the edge device 102 I(x) can include two main light sources: air light and light that has been reflected by the surrounding objects in the environment. Air light is typically homogeneous and parallel white light in the scene, which is represented by A. The real scene of object is represented by J(x). For the object captured in the image, object-reflected light obtained by the image sensor can be represented as: J(x)t(x). Because of the scattering effects, some portions of air light can be scattered to the region where the target object located. And this portion of air light can be represented as: A(1−t(x)). Therefore, the object image captured by image sensor can be represented by Eq. (1):

$$I(x)=J(x)t(x)+A(1-t(x)) \tag{1}$$

In Eq. (1), t(x) is the transmission map corresponding to the image. The transmission map can include light that is not scattered prior to reaching the image sensor. The transmission map t(x) can be computed via Eq. (2):

$$t(x)=\exp(-\beta d(x)) \tag{2}$$

Where, d(x) is the distance from the scene point to the image sensor, and is the scattering coefficient of the atmosphere. Eq. (3) suggests that when d(x) goes to infinity, t(x) approaches zero.

$$A=I(x), d(x) \rightarrow \inf \tag{3}$$

In practical imaging of a distance view, d(x) of objects cannot be infinity. However, in a view, the distance from the air light can be regarded as infinity. As a result, together with Eq. (1), the air light estimation function can be given by Eq. (4):

$$I_{sky}(x)=A \tag{4}$$

The dark channel can be the smallest value in a set of Red, Green, and Blue channels. The dark channel prior can be based on the wide observation on outdoor haze-free images. In most of the haze-free patches, at least one color channel has some pixels whose intensity values are very low and even close to zero. The dark channel is defined as the minimum of all pixel colors in a local patch:

$$D(x) = \underset{y \in \Omega_r(x)}{\text{Min}} \left( \underset{c \in \{r,g,b\}}{\text{Min}} (I^c(y)) \right) \tag{5}$$

$I_c$ can be an RGB color channel of I and $\Omega_r(x)$ is a local patch centered at x with the size of r×r. The dark channel feature has a high correlation to the amount of haze in the image and can be used to estimate the medium transmission $t(x) \propto 1 - D(x)$ directly. Based on Eq. (4), the pixels with the highest dark channel value can be used as the air light A. However, in some cases, there are some bright pixels such as white vehicles or white buildings in the image. Based on Eq. (1), we do the normalization in Eq. (6):

$$\frac{I(x)}{A} = t(x) * \frac{J(x)}{A} + (1 - t(x)) \tag{6}$$

The edge device 102 can determine a patch size value based on the application. Alternatively, the patch size can be hard coded into the edge device 102 manually based on prior knowledge of the environment. If the resolution of the object in the image is low, the edge device 102 can decrease the patch size to determine the dark channel more accurately. Conversely, for images with high resolution objects, the edge device 102 can increase the patch size to reduce noise in the image. In an illustrative example, the resolution of the image captured by the sensor can be, for example, 640*480, and the edge device 102 can determine a corresponding local patch size to be (5×5). The equation is shown in Eq. (7):

$$\underset{y \in \Omega_r(x)}{\text{Min}} \left( \underset{c \in \{r,g,b\}}{\text{Min}} \left( \frac{I^c(y)}{A^c} \right) \right) = t(x) \underset{y \in \Omega_r(x)}{\text{Min}} \left( \underset{c \in \{r,g,b\}}{\text{Min}} \left( \frac{J^c(y)}{A^c} \right) \right) + 1 - t(x) \tag{7}$$

In some examples, the real scene $J^c(y)$ has the feature:

$$J^{dark}(x) = \underset{y \in \Omega_r(x)}{\text{Min}} \left( \underset{c \in \{r,g,b\}}{\text{Min}} \left( \frac{J^c(y)}{A^c} \right) \right) \to 0 \tag{8}$$

Eq. (7) can be rewritten as Eq. (9):

$$t(x) = 1 - \underset{y \in \Omega_r(x)}{\text{Min}} \left( \underset{c \in \{r,g,b\}}{\text{Min}} \left( \frac{I^c(y)}{A^c} \right) \right) \tag{9}$$

The expression $$\underset{y \in \Omega_r(x)}{\text{Min}} \left( \underset{c \in \{r,g,b\}}{\text{Min}} \left( \frac{I^c(y)}{A^c} \right) \right)$$

can be equivalent to the dark channel value of the normalized haze image $I^{dark}(x)/A$, which can be used to compute the transmission map t(x) directly.

Typically, the color of a sky portion of a hazy image I is usually very similar to the atmospheric light A, because the sky's transmission is typically negligible. In practice, even on clear days the atmosphere is not absolutely free of any particle. Therefore, the haze still exists when observing distant objects. In some examples, the edge device 102 can account for a small amount of haze associated with distant objects by introducing a constant parameter ω(0<ω≤1) into Eq. (10):

$$t(x) = 1 - \omega \cdot \underset{y \in \Omega_r(x)}{\text{Min}} \left( \underset{c \in \{r,g,b\}}{\text{Min}} \left( \frac{I^c(y)}{A^c} \right) \right) \tag{10}$$

The edge device 102 can perform the above modification to adaptively account for additional haze associated with the distant objects. The value of ω is application based and can be adjusted by the edge device 102 based on conditions in the environment. Visibility can be defined as a distance at which an object or light can be clearly discerned. Visibility can be defined in an exemplary situation in which a perfectly black object is viewed against a perfectly white background. The visual contrast, $C_v(x)$, at a distance d from the black object can be defined as the relative difference between the light intensity of the background and the object:

$$C_v(x) = \frac{F_B(x) - F(x)}{F_B(x)} \tag{11}$$

$F_B(x)$ and F(x) can be the intensities of the background of the environment and the object in the environment, respectively. The edge device 102 can treat the background intensity as a constant, while the object intensity can decrease with the increase of distance due to the scattering effects.

$$\begin{cases} dF_B(x) = 0 \\ dF(x) = -\gamma * F \ dx \end{cases} \tag{12}$$

Where γ is the scattering coefficient. The visual contrast $C_v(x)$ can be computed using the Beer-Lambert law, as recited below in Eq. (13).

$$\frac{dC_v(x)}{dx} = -\gamma C_v(x) \to C_v(x) = \exp(-\gamma x) \tag{13}$$

In some examples, contrast ratios between roughly 0.018 and roughly 0.03 may be perceptible under typical daylight viewing conditions. In some examples, a contrast ratio substantially similar to about 2% ($C_v$=0.02) can be used by the edge device 102 to determine a visual range. The edge device 102 that is positioned in the environment can determine the visibility of the environment based on the transmission map t(x) as shown in Eq. (10). Determining the visibility can involve determining a mathematical relationship between t(x) and $C_v(x)$, as shown in Eq. (14).

$$\begin{cases} C_v(x) = \exp(-\gamma x) \\ t(x) = \exp(-\beta x) \end{cases} \to \beta = f(\gamma) \tag{14}$$

Once the edge device 102 has determined the visibility of the environment, the edge device 102 can generate information based on the visibility. The information can indicate the visibility and can include a recommended course of action for an agent on the road. In some examples, data that can be used to generate a recommended course of action.

In some examples, a processing device can be used to determine the visibility measure and to generate the information associated therewith. FIG. 5 is a flow chart of such a process 500 for determining a visibility measure of an environment by a processing device and based on an image of the environment according to at least one example. The processing device can be the processor 202, or any other suitable processing device. The process 500 can be implemented based on one or more of the equations 1-14 recited in the previous section, or any other suitable equations.

FIGS. 5 and 6 illustrate example flow diagrams showing processes 500 and 600, according to at least a few examples. These processes, and any other processes described herein are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types.

The order in which the operations are described is not intended to be construed as a limitation, and any number of the described operations can be combined in any order and/or in parallel to implement the processes. Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

The process begins at block 502 of the process 500, where the processing device can acquire an image of an environment. To acquire the image of the environment, the processing device can issue a command to the image sensor to capture an image. In some examples, the image sensor can include a clocking device, and can continually capture images based on a sample rate that can be determined by the clocking device. In some examples, the processing device can issue a query to retrieve the image from the image sensor. The processing device can, upon retrieving the image, store the image in memory. The image sensor can be a conventional camera, an event camera, or any other suitable optical image sensor that can capture a photographic image of the environment. In some examples, the image sensor can be housed within the processing device. In some examples, the image sensor can be communicatively coupled with the processing device via an edge network that the processing device is in communication with.

At block 504 of the process 500, the processing device can process the image to determine a visual contrast of the environment. The visual contrast of the image can be used to determine an amount of visibility in the environment. Processing the image can involve performing one or more mathematical operations on the image. In some examples, the processing device can determine the visual contrast of the environment based on Eq. (11). That is, the processing device can compute a difference between a light intensity of a background of the image and a light intensity of a foreground object in the image.

At block 506 of the process 500, the processing device can determine, based on the visual contrast of the image, a visibility measure corresponding to an amount of visibility in the environment. In some examples, determining the visibility measure can involve determining a dark channel of the image. Determining the dark channel of the image may involve computing one or more local minima corresponding to one or more red, green, and blue channels encoded in the image. The processing device can also determine a patch size based on a resolution of the image for determining the dark channel of the image. In some examples, the processing device can determine the dark channel based on Eq. (9).

In some examples, determining the visibility measure can involve determining a transmission map of the image. For example, the processing device can determine the transmission map of the image based on the dark channel of the image. The edge device 102 can generate a normalized haze image based on the image. In some examples, the processing device can determine the transmission map of the image based on a dark channel value of the normalized haze image.

At block 508 of the process 500, the processing device can generate information corresponding to the visibility measure. The information can indicate the visibility measure and may include a recommendation to take a course of action based on the value of the visibility measure. For example, if the visibility measure indicates low visibility conditions in the environment, the information may include a recommendation to exercise caution, or to deploy certain safety measures to prevent visibility-related motor vehicle accidents. In some examples, subsequent to generating the information, the processing device can transmit the information to one or more external electronic devices.

In some examples, the edge device can generate information, based on the visibility measure, in a format that is ingestible by a traffic management system. For example, the information can be embedded within a particular file format, such as JSON, and transmitted to a server associated with a traffic management system. In an illustrative example, the server associated with the traffic management systems can transmit warnings to drivers to warn drivers of adverse visibility conditions.

In some examples, the information can include human-readable data that is configured to be displayed to and interpreted by non-technical operators of motor vehicles in real-time. In some examples, the information may include metadata, such as timestamp data indicating the time at which the information was generated. In some examples, the timestamp data can indicate the time at which the image was generated.

In some examples, the visibility measure can be determined by an edge device. FIG. 6 is a flow chart of a process for determining a visibility measure of an environment via an edge device and based on an image of the environment according to at least one example. The edge device can be the same as or different from the edge device 102.

The process begins at block 602 of the process 600, where the edge device can receive, from an image sensor, an image of an environment. In some examples, the edge device can issue a command to the image sensor that can cause the image sensor to transmit the image to the edge device. The edge device can store the image in a storage device that may be housed within and/or communicatively coupled to the edge device. The image sensor can be a conventional camera, an event camera, or any other suitable optical image sensor that can capture a photographic image of the environment.

At block 604 of the process 600, the edge device can determine a visibility measure corresponding to the environment by determining a dark channel of the image, determining, based on the dark channel of the image, a transmission map of the image, and determining, based on the transmission map, a visual contrast of the image. The edge device can determine the dark channel by performing calculations shown Eq. (5). In some examples, determining the dark channel can involve estimating an amount of air light in the image. The edge device can estimate the amount of air light in the image based on Eq. (4).

At block 606 of the process 600, the edge device can generate information corresponding to the visibility measure. The edge device can transmit the information to other edge devices on an edge network that the edge device is in communication with. Additionally or alternatively, the edge device can transmit the information to one or more electronic devices in the environment. For example, the edge device can transmit the information to a connected and autonomous vehicle to provide the connected and autonomous vehicle with recent and localized information regarding the visibility conditions in the environment.

In some examples, the edge device can generate information, based on the visibility measure, in a format that can be human-readable and can be acted upon by drivers of motor vehicles. In some examples, the information can include human-readable data that is configured to be displayed to and interpreted by non-technical operators of motor vehicles in real-time. In some examples, the information may include metadata, such as timestamp data indicating the time at which the information was generated. In some examples, the timestamp data can indicate the time at which the image was generated.

In some examples, the edge device can include or be communicatively coupled to a display. The edge device can update the display based on the information corresponding to the visibility measure. For example, the edge device can display a message indicating low visibility conditions in the environment.

Figure 7:
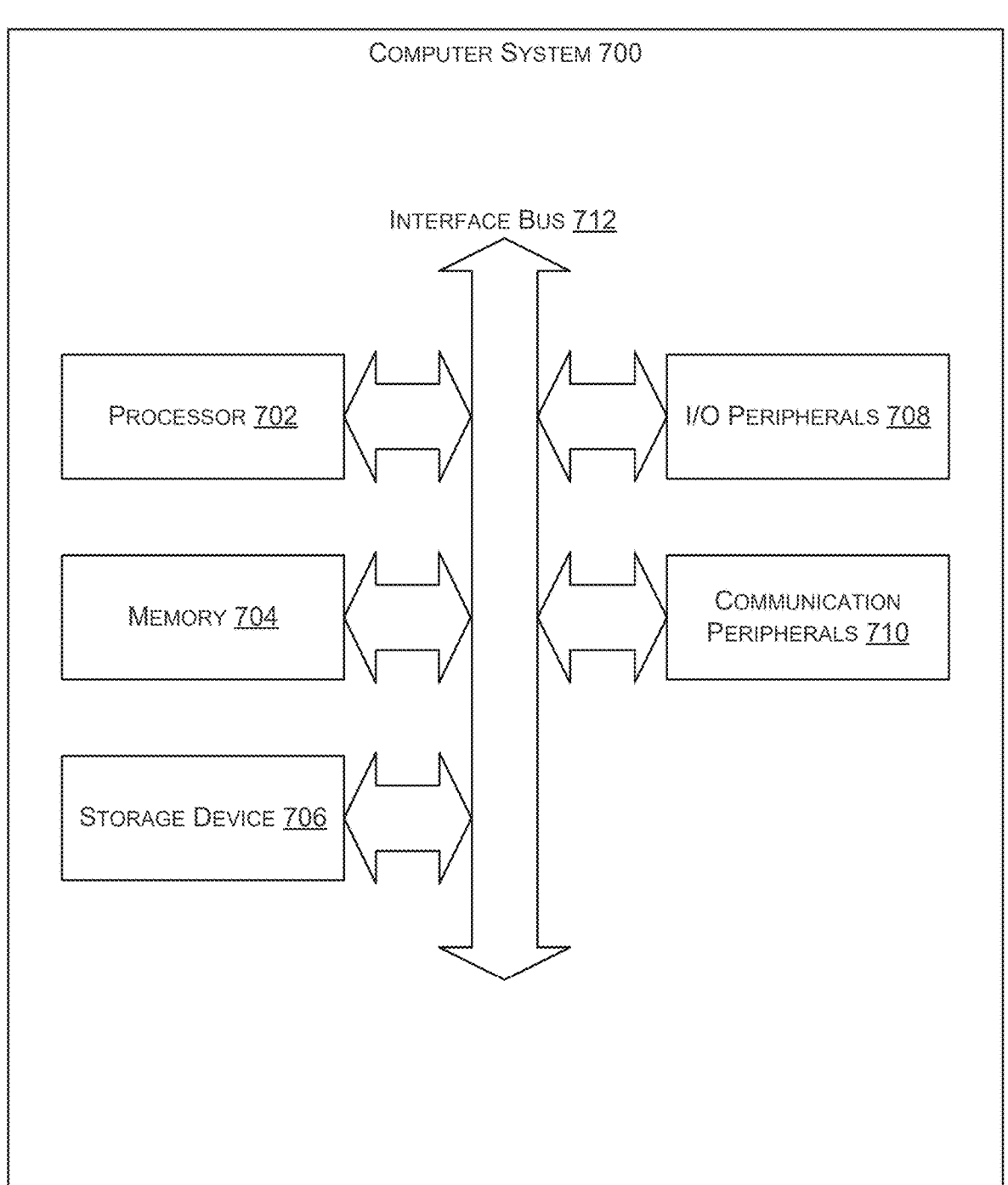
FIG. 7 illustrates example components of a computer system in accordance with embodiments of the present disclosure.

FIG. 7 illustrates example components of a computer system 700, in accordance with embodiments of the present disclosure. The computer system 700 can be used as a node in a computer network, where this node provides one or more computing components of an underlay network of the computer network and/or one or more computing components of an overlay network of the computer network. Additionally or alternatively, the components of the computer system 700 can be used in an endpoint. Although the components of the computer system 700 are illustrated as belonging to a same system, the computer system 700 can also be distributed (e.g., between multiple user devices). The computer system 700 can be an example of the edge device 102, the electronic devices 140, elements of the infrastructure management, and any other suitable electronic device described herein.

The computer system 700 can include at least a processor 702, a memory 704, a storage device 706, input/output peripherals (I/O) 708, communication peripherals 710, and an interface bus 712. The interface bus 712 is configured to communicate, transmit, and transfer data, controls, and commands among the various components of the computer system 700. The memory 704 and the storage device 706 include computer-readable storage media, such as RAM, ROM, electrically erasable programmable read-only memory (EEPROM), hard drives, CD-ROMs, optical storage devices, magnetic storage devices, electronic non-volatile computer storage; for example, Flash® memory, and other tangible storage media. Any of such computer-readable storage media can be configured to store instructions or program codes embodying aspects of the disclosure. The memory 704 and the storage device 706 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 700.

Further, the memory 704 includes an operating system, programs, and applications. The processor 702 is configured to execute the stored instructions and includes, for example, a logical processing unit, a microprocessor, a digital signal processor, and other processors. The memory 704 and/or the processor 702 can be virtualized and can be hosted within another computer system of, for example, a cloud network or a data center. The I/O peripherals 708 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 708 are connected to the processor 702 through any of the ports coupled to the interface bus 712. The communication peripherals 710 are configured to facilitate communication between the computer system 700 and other systems over a communications network and include, for example, a network interface controller, modem, wireless and wired interface cards, antenna, and other communication peripherals.

The computer system 700 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random-access memory ("RAM") or read-only memory ("ROM"), as well as removable media devices, memory cards, and/or flash cards.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

All references, including publications, patent applications, and patents, cited herein are hereby incorporated by reference to the same extent as if each reference were individually and specifically indicated to be incorporated by reference and were set forth in its entirety herein.

What is claimed is:

1. An edge device comprising:
a processing device;
an image sensor; and
a memory having instructions that are executable by the processing device for causing the processing device to:
receive, from the image sensor, an image of an environment;
determine a visibility measure corresponding to the environment by:
determining a dark channel of the image;
determining, based on the dark channel of the image, a transmission map of the image; and
determining, based on the transmission map, a visual contrast of the image; and
generate information corresponding to the visibility measure.

2. The edge device of claim 1, wherein determining the transmission map of the image further comprises generating a normalized haze image based on the image.

3. The edge device of claim 2, wherein determining the transmission map further comprises determining a dark channel value of the normalized haze image.

4. The edge device of claim 1, wherein the instructions are further executable by the processing device for causing the processing device to transmit the information corresponding to the visibility measure to an external device that is in network communication with the edge device.

5. The edge device of claim 1, wherein determining the dark channel of the image comprises determining a local minimum corresponding to red, green, and blue channels in the image.

6. The edge device of claim 5, wherein determining the dark channel of the image further comprises determining a patch size based on a resolution of the image.

7. The edge device of claim 1 wherein the edge device is configured to determine the visibility measure corresponding to the environment substantially contemporaneous to receiving the image of the environment.

8. A non-transitory computer-readable medium comprising instructions that are executable by a processing device for causing the processing device to:
receive, from an image sensor, an image of an environment;
determine a visibility measure corresponding to the environment by:
determining a dark channel of the image;
determining, based on the dark channel of the image, a transmission map of the image; and
determining, based on the transmission map, a visual contrast of the image; and
generate information corresponding to the visibility measure.

9. The computer-readable medium of claim 8, wherein determining the transmission map further comprises generating, based on the image, a normalized haze image.

10. The computer-readable medium of claim 9, wherein determining the transmission map further comprises determining a dark channel value of the normalized haze image.

11. The computer-readable medium of claim 8, wherein the instructions are further executable by the processing device for causing the processing device to transmit the visibility measure to an external device that is in network communication with the processing device.

12. The computer-readable medium of claim 8, wherein determining the dark channel of the image comprises determining a local minimum corresponding to red, green, and blue channels in the image.

13. The computer-readable medium of claim 8, wherein determining the dark channel of the image further comprises determining a patch size based on a resolution of the image.

* * * * *